US011928989B2

(12) United States Patent
Watanabe

(10) Patent No.: US 11,928,989 B2
(45) Date of Patent: Mar. 12, 2024

(54) ROLLABLE DISPLAY DEVICE

(71) Applicant: SHARP KABUSHIKI KAISHA, Sakai (JP)

(72) Inventor: Noriko Watanabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 586 days.

(21) Appl. No.: 17/278,012

(22) PCT Filed: Sep. 27, 2018

(86) PCT No.: PCT/JP2018/035958
§ 371 (c)(1),
(2) Date: Mar. 19, 2021

(87) PCT Pub. No.: WO2020/065827
PCT Pub. Date: Apr. 2, 2020

(65) Prior Publication Data
US 2021/0383731 A1 Dec. 9, 2021

(51) Int. Cl.
*G06F 1/16* (2006.01)
*G09F 9/30* (2006.01)
*H05K 5/00* (2006.01)
*H05K 7/00* (2006.01)

(52) U.S. Cl.
CPC .................................... *G09F 9/301* (2013.01)

(58) Field of Classification Search
CPC ............................... G06F 1/1652; G09F 9/301
See application file for complete search history.

(56) References Cited

U.S. PATENT DOCUMENTS 9,098,241 B1 8/2015 Cho et al.
10,222,834 B2 * 3/2019 Choi ..................... G06F 1/1652
11,481,003 B2 * 10/2022 Cho ...................... G06F 1/1652
2016/0029474 A1 1/2016 Cho et al.
2016/0187929 A1 * 6/2016 Kim ...................... G06F 1/1643 345/184
2016/0313848 A1 * 10/2016 Rhee ................... H01L 25/0753
2017/0061932 A1 * 3/2017 Kwon ................... G06F 1/1626
2017/0071066 A1 3/2017 Cho et al.
2017/0196103 A1 7/2017 Cho et al.
2017/0367198 A1 * 12/2017 Park ....................... H10K 50/84
2019/0037716 A1 * 1/2019 Kim ..................... H05K 5/0017
2019/0131364 A1 * 5/2019 Hayk .................... G06F 3/0412
2019/0212780 A1 * 7/2019 Choi ....................... G09F 9/301
2019/0261519 A1 * 8/2019 Park .................... H04M 1/0268
2019/0324501 A1 * 10/2019 Kim ..................... H05K 5/0017
2020/0077194 A1 * 3/2020 Kim ....................... H04R 7/045
2020/0084897 A1 * 3/2020 Shin ..................... H05K 5/0017

FOREIGN PATENT DOCUMENTS

JP 2016024460 A 2/2016

* cited by examiner

*Primary Examiner* — Anthony M Haughton
(74) *Attorney, Agent, or Firm* — ScienBiziP, P.C.

(57) ABSTRACT

A rollable display device includes a flexible display panel, a storage unit provided at one end side of the flexible display panel, a support bar provided at the other end side of the flexible display panel, a plurality of glass substrates aligned side by side in a direction intersecting a winding direction of the flexible display panel, and a cover layer formed to cover the glass substrates.

12 Claims, 4 Drawing Sheets

ROLLABLE DISPLAY DEVICE

TECHNICAL FIELD

The disclosure relates to a rollable display device including a flexible display panel formed to be wound.

BACKGROUND ART

A rollable display device provided with a windable flexible display panel made of a flexible film material and is known (PTL 1).

CITATION LIST

Patent Literature

PTL 1: JP 2016-24460 A (published Feb. 8, 2016)

SUMMARY

Technical Problem

When, the flexible display panel provided in the rollable display device is repeatedly wound and unwound, the display panel curls, and the flatness of the display panel deteriorates. To improve the deterioration of the flatness, when a thin glass substrate is provided on the flexible display panel as a cover film, the flatness improves.

However, a thin glass substrate tends to crack when scratched. Further, there is a problem that, when this crack crosses a display surface of the flexible display panel, the flexible display panel bends at an acute angle at the cracked position, and a bending stress exceeding a tolerance acts on the flexible display panel and damages the flexible display panel.

An object of the disclosure is to provide a rollable display device capable of suppressing a damage of a flexible display panel due to a crack which occurs in a thin glass substrate to improve the deterioration of the flatness.

Solution to Problem

A rollable display device according to an aspect of the disclosure includes a flexible display panel formed to be wound, a storage unit provided at one end side of the flexible display panel to wind the flexible display panel, a support bar provided at the other end side of the flexible display panel to support the flexible display panel, a plurality of glass substrates aligned side by side along a direction intersecting a winding direction of the flexible display panel to maintain a flatness of the flexible display panel unwound from the storage unit, and a cover layer formed to cover the glass substrates to protect the glass substrates.

Advantageous Effects of Disclosure

According to aspects of the disclosure, a damage of a flexible display panel due to a crack which occurs in a thin glass substrate to improve the deterioration of the flatness can be suppressed.

DESCRIPTION OF EMBODIMENTS

First Embodiment

Figure 1:
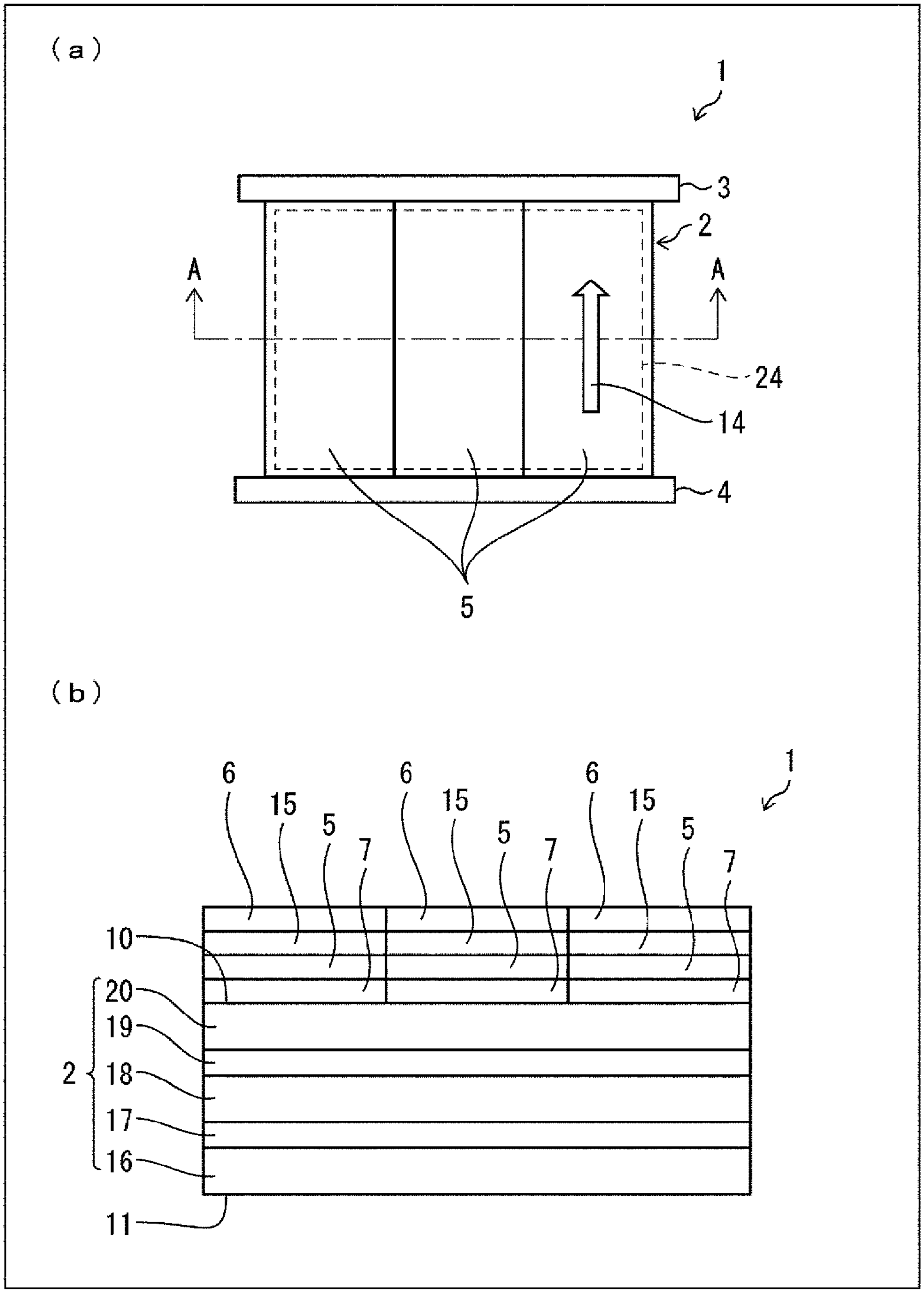
FIG. 1(*a*) is a schematic front view of a rollable display device according to a first embodiment, and FIG. 1(*b*) is a cross-sectional view taken along plane AA illustrated in FIG. 1(*a*).

FIG. 1(*a*) is a schematic front view of a rollable display device 1 according to a first embodiment, and FIG. 1(*b*) is a cross-sectional view taken along plane AA illustrated in FIG. 1(*a*). The rollable display device 1 includes a flexible display panel 2 formed to be wound, a storage unit 3 provided at one end side of the flexible display panel 2 to wind the flexible display panel 2, and a support bar 4 provided at the other end side of the flexible display panel 2 to support the flexible display panel 2.

The flexible display panel 2 may be any flexible display panel, and for example, an organic light-emitting diode (OLED) display panel, a quantum dot light emitting diode (QLED) display panel, a liquid crystal display panel, or the like can be used.

The flexible display panel 2 is formed by layering a display device 16 having a display region 24 including a plurality of light-emitting elements, a first resin layer (adhesive layer) 17, a touch panel 18, a second resin layer (adhesive layer) 19, and an antireflection layer 20 such as a polarizer in this order.

In order to maintain the flatness of the flexible display panel 2 unwound from the storage unit 3, the rollable display device 1 is provided with three glass substrates 5 aligned side by side along a direction perpendicular to a winding direction 14 of the flexible display panel 2 are provided. The number of glass substrates 5 is not limited to three, and a plurality of glass substrates 5 may be aligned. The display region 24 is positioned inside three glass substrates 5 as illustrated in FIG. 1(*a*).

The flexible display panel 2 has a display surface 10 from which light for display is emitted, and a back surface 11 formed at a side opposite to the display surface 10. Three glass substrates 5 are aligned at a display surface 10 side of the flexible display panel 2.

An adhesive resin layer 7 made of an adhesive is formed between three glass substrates 5 and the antireflection layer 20 of the flexible display panel 2. Each of three adhesive resin layers 7 is provided on each of the three glass substrates 5. The adhesive resin layer 7 may have a single sheet-like shape that is commonly provided on three (plural) glass substrates 5. A cut may be formed on the adhesive resin layer 7 having the single sheet-like shape at a position corresponding to a boundary of adjacent glass substrates 5.

The rollable display device 1 includes a cover layer 6 so as to cover the glass substrate 5 in order to protect the glass substrate 5. Each of three cover layers 6 is provided on each of three glass substrates 5. The cover layer 6 is made of, for example, a film such as PET and transparent PI, and has a thickness of 50 μm or more and 200 μm or less. The cover layer 6 may have a single sheet-like shape and be commonly provided on three (plural) glass substrates.

An outer interlayer resin layer 15, which is an adhesive, is formed between the cover layer 6 and the glass substrate 5. Each of three outer interlayer resin layers 15 is provided on each of three cover layers 6 and three glass substrates 5. The outer interlayer resin layer 15 may have a single sheet-like shape and be commonly provided on three (plural) glass substrates.

As illustrated in FIG. 1(*a*), each of the three glass substrates 5 has a rectangular shape and formed to continuously cover from one end of the display region 24 on the storage unit 3 side to the other end of the display region 24 on the support bar 4 side. By forming the glass substrate 5 in this manner, when the flexible display panel 2 is unwound from the storage unit 3, an image can be displayed without making a crease on the display region 24.

The glass substrate 5 has a thickness of from 50 μm or more and 200 μm or less, and preferably 50 μm or more and 100 μm or less. The glass substrate 5 is preferably made of tempered glass.

The adhesive resin layer 7 is made of a material having peelability that is improved by an irradiation with ultraviolet rays. The adhesive resin layer 7 has a thickness of, for example, 25 μm or more and 100 μm or less.

When a crack that has occurred by scratching a thin glass substrate crosses a display surface of a flexible display panel, the flexible display panel may be bent at the cracked position and damaged.

According to the first embodiment, the glass substrate for maintaining the flatness of the flexible display panel 2 unwound from the storage unit 3, is divided into three glass substrates 5. Therefore, even if a crack occurs in one of the three glass substrates 5, the crack only spreads in the one of the glass substrates, and propagation of the crack stops at a boundary with an adjacent glass substrate 5.

Therefore, it is possible to prevent a situation that the crack crosses the entire display surface 10 of the flexible display panel 2 beyond the boundary, the flexible display panel 2 bends at the cracked position, a bending stress exceeding a tolerance acts on the flexible display panel 2, and the flexible display panel 2 is damaged.

Since three glass substrates 5 are aligned side by side along the direction perpendicular to the winding direction 14 of the flexible display panel 2, the flexible display panel 2 can be easily wound.

Figure 2:
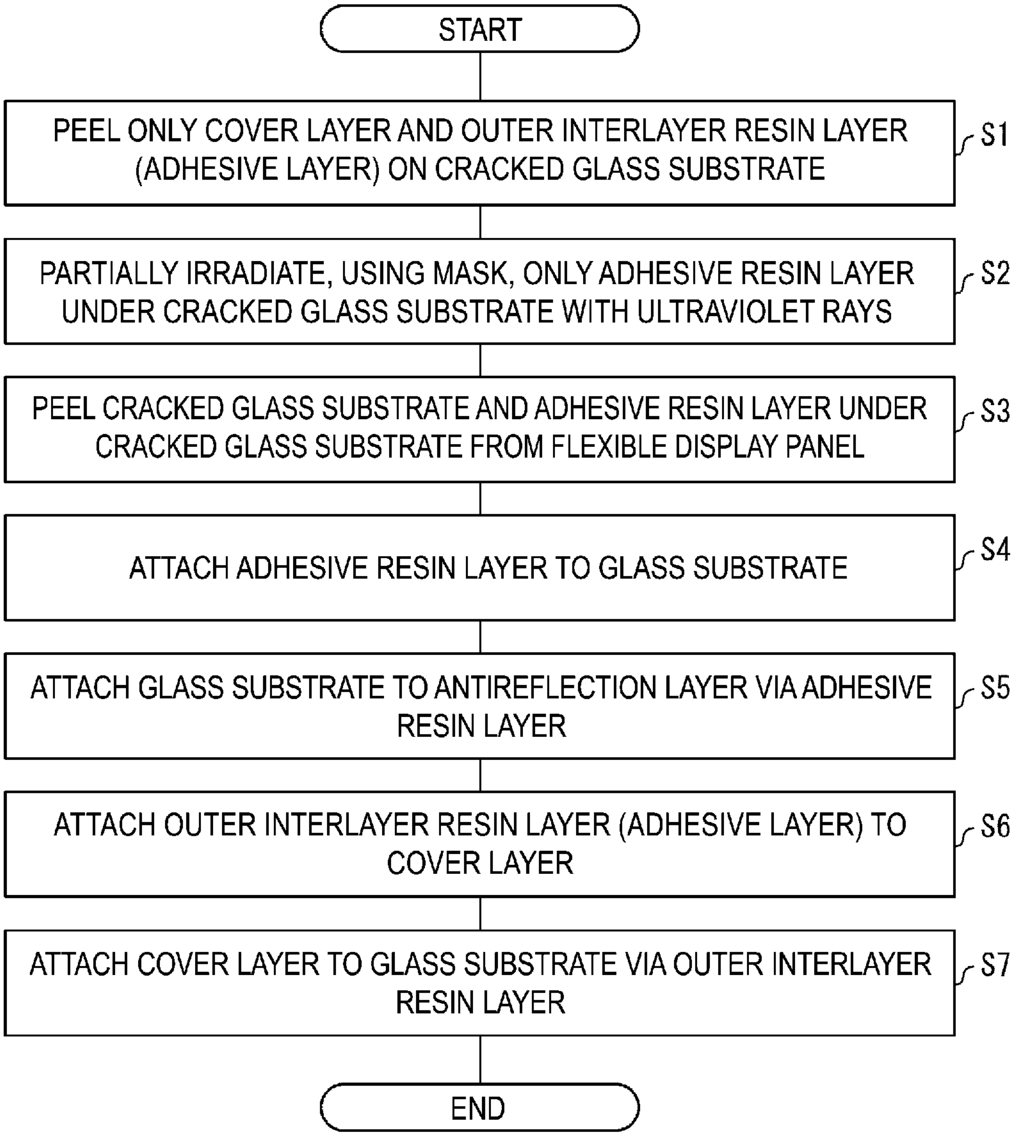
FIG. 2 is a flowchart illustrating a rework flow of the above-described rollable display device.

FIG. 2 is a flowchart illustrating a rework flow of the rollable display device 1. For example, when a crack occurs (or a breakage occurs) in one of three glass substrates 5, first, of three cover layers 6 and three outer interlayer resin layers 15, only the cover layer 6 and the outer interlayer resin layer 15 positioned on the glass substrate 5 where the crack has occurred are peeled from the glass substrate 5 (step S1).

Then, the adhesive resin layer 7 under the glass substrate 5 where the crack has occurred is irradiated with ultraviolet rays through the glass substrate 5, while masking remaining two cover layers 6 with a mask (step S2). Since the adhesive resin layer 7 has been irradiated with the ultraviolet rays, the adhesiveness with the antireflection layer 20 of the flexible display panel 2 is lost, and peelability from the antireflection layer 20 is improved.

Next, the glass substrate 5 where the crack has occurred and the adhesive resin layer 7 irradiated with the ultraviolet rays are peeled from the antireflection layer 20 of the flexible display panel 2 (step S3).

Thereafter, an adhesive resin layer 7 for replacement is attached to a glass substrate 5 for replacement (step S4). Then, the glass substrate 5 for replacement to which the adhesive resin layer 7 for replacement is attached is attached to the antireflection layer 20 of the flexible display panel 2 via the adhesive resin layer 7 for replacement (step S5). Thereafter, an outer interlayer resin layer 15 for replacement is attached to a cover layer 6 for replacement (step S6). Next, the cover layer 6 for replacement to which the outer interlayer resin layer 15 for replacement is attached is attached to the glass substrate 5 for replacement via the outer interlayer resin layer 15 for replacement (step S7).

As described above, the outer interlayer resin layer 15 on the opposite side of the glass substrate 5 to the flexible display panel 2 is made of a material that absorbs ultraviolet rays, and the adhesive resin layer 7 on the flexible display panel 2 side of the glass substrate 5 is made of a material having peelability that is improved by irradiation with ultraviolet rays. As a result, the glass substrate 5 where a crack has occurred is easily replaced, and ease of the rework of the flexible display panel 2 is improved.

In the above, when the cover layer 6 and the outer interlayer resin layer 15 are commonly provided on the plurality of glass substrates 5, not only the cracked glass substrate 5 but also all the glass substrates 5 are peeled from the flexible display panel 2, and a plurality of new glass substrates 5 are attached thereto.

Second Embodiment

Figure 3:
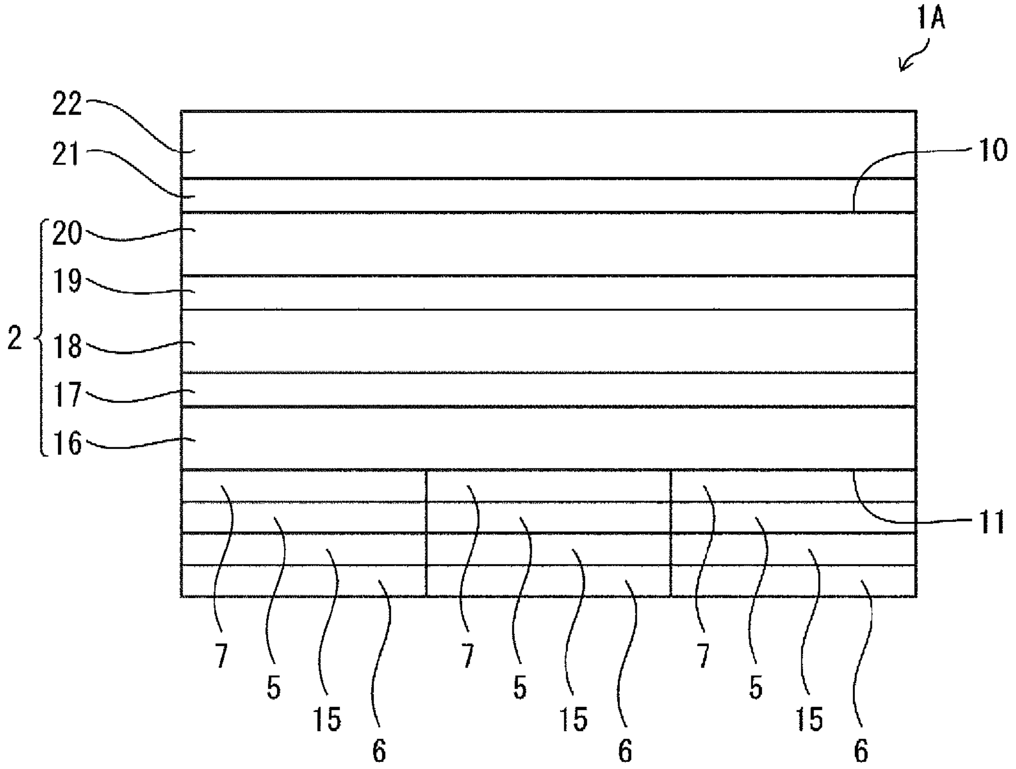
FIG. 3 is a cross-sectional view of a rollable display device according to a second embodiment.

FIG. 3 is a cross-sectional view of a rollable display device 1A according to a second embodiment. The same reference numerals are added to constituent elements described in the above-described embodiment, and detailed descriptions thereof are not repeated.

The difference from the above-described first embodiment is that the glass substrates 5 for maintaining the flatness of the flexible display panel 2 unwound from the storage unit 3 are aligned on the back surface 11 side of the flexible display panel 2 in the second embodiment, whereas the glass substrates 5 are aligned on the display surface 10 side of the flexible display panel 2 in the first embodiment.

An adhesive resin layer 7 made of an adhesive is formed between three glass substrates 5 and the display device 16 of the flexible display panel 2. Each of three adhesive resin layers 7 is provided on each of the three glass substrates 5. The adhesive resin layer 7 may have a single sheet-like shape that is commonly provided on three (plural) glass substrates 5.

The rollable display device 1A includes a cover layer 6 made of a material that absorbs ultraviolet rays so as to cover the glass substrate 5 in order to protect the glass substrate 5. Each of three cover layers 6 is provided on each of three glass substrates 5. The cover layer 6 may have a single sheet-like shape and be commonly provided on three (plural) glass substrates.

An outer interlayer resin layer 15 made of an adhesive that absorbs ultraviolet rays is formed between the cover layer 6 and the glass substrate 5. Each of three outer interlayer resin layers 15 is provided on each of three cover layers 6 and three glass substrates 5. The outer interlayer resin layer 15 may have a single sheet-like shape and be commonly provided on three (plural) glass substrates 5.

Then, a cover film 22 may be attached to the display surface 10 of the flexible display panel 2 via a third resin layer (adhesive layer) 21.

In the second embodiment, since the three glass substrates 5 for maintaining the flatness of the flexible display panel 2 are positioned on the back surface 11 side of the flexible display panel 2, the boundary between adjacent glass substrates 5 is not visible from the display surface 10 side of the flexible display panel 2. Therefore, display performance of the rollable display device 1A is improved.

In the second embodiment, the rework of the rollable display device 1A can also be performed by the same manner as that illustrated in FIG. 2 of the first embodiment.

Third Embodiment

Figure 4:
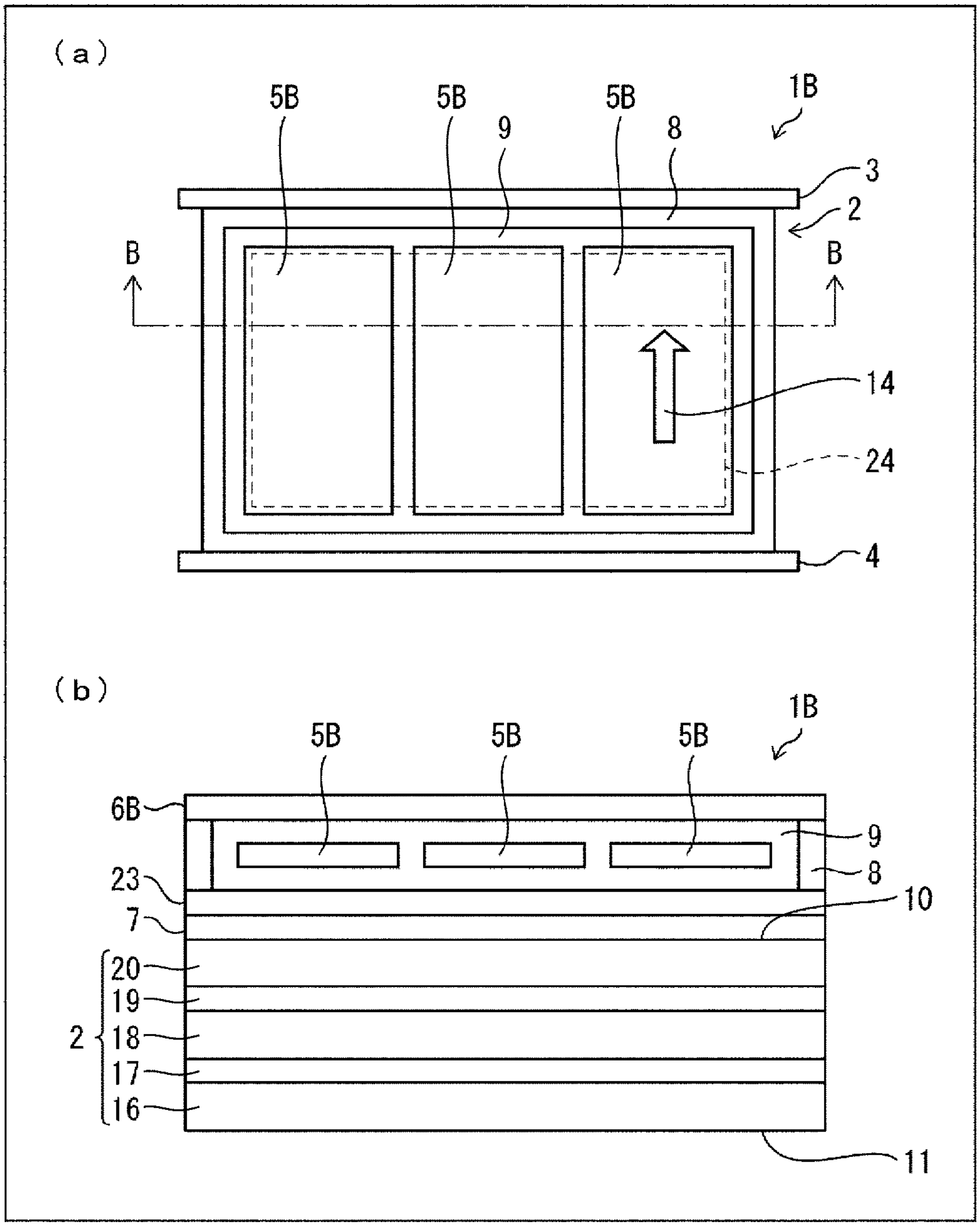
FIG. 4(*a*) is a schematic front view of the rollable display device according to a third embodiment, and FIG. 4(*b*) is a cross-sectional view taken along plane BB illustrated in FIG. 4(*a*).

FIG. 4(*a*) is a schematic front view of a rollable display device 1B according to a third embodiment, and FIG. 4(*b*) is a cross-sectional view taken along plane BB illustrated in FIG. 4(*a*). The same reference numerals are added to constituent elements described in the above-described embodiments, and detailed descriptions thereof are not repeated.

The difference from the above-described first embodiment is that a fluid filler 9 having the same refractive index as the glass substrate 5 is filled around three glass substrates 5.

An adhesive resin layer 7 and an interlayer resin layer 23 are layered in this order on the display surface 10 side of the flexible display panel 2. Then, a sealing member 8 for sealing three glass substrates 5 is formed between a cover layer 6B and the interlayer resin layer 23. The sealing member 8 is placed at a position corresponding to a frame region that is outside the display region 24 on the display surface 10 of the flexible display panel 2. Therefore, the sealing member 8 need not be transparent.

A space formed by the cover layer 6B, the sealing member 8, and the interlayer resin layer 23 is filled with the fluid filler 9.

The fluid filler 9 preferably has thixotropy that shows a property that the apparent viscosity under a constant shear rate is decreased over time and gradually restored when the shear stress is removed. As a result, the viscosity of the fluid filler 9 decreases according to the shear stress that acts on the wound flexible display panel 2, and the fluid filler 9 becomes liquid. Further, if a crack occurs in the glass substrate 5 when the flexible display panel 2 is opened from the storage unit 3, the liquid fluid filler 9 enters the crack. Thereafter, when the shear stress is removed, the viscosity of the fluid filler 9 that has entered the crack is restored and the fluid filler 9 solidifies. As a material of the fluid filler 9 having such thixotropy, a transparent silicone gel, a transparent epoxy resin, or the like can be used. In order to obtain a fluid filler having the same refractive index as the glass substrate 5, the fluid filler 9 may contain glass beads and resin beads such as epoxy polycarbonate and acrylic.

Since the fluid filler 9 having the same refractive index as the glass substrate 5 is filled around the glass substrate 5 in this manner, a boundary between adjacent glass substrates 5 is hardly seen from the display surface 10 side of the flexible display panel 2. Therefore, display performance of the rollable display device 1B is improved.

Furthermore, even if a crack occurs in the glass substrate 5, the fluid filler 9 permeates the crack, so the crack which has occurred in the glass substrate 5 is not easily seen from the display surface 10 side of the flexible display panel 2.

In the above-described embodiments, the cases where three glass substrates 5 are used have been described, but any number of glass substrates 5 may be used as long as the glass substrates 5 are plural. Further, in the first and second embodiments, the number of each of the cover layer 6, the outer interlayer resin layer 15, and the adhesive resin layer 7 is not limited to three, and may be one or more.

Supplement

A rollable display device according to a first aspect includes a flexible display panel formed to be wound, a storage unit provided at one end side of the flexible display panel to wind the flexible display panel, a support bar provided at the other end side of the flexible display panel to support the flexible display panel, a plurality of glass substrates aligned side by side along a direction intersecting a winding direction of the flexible display panel, and a cover layer formed to cover the glass substrate.

In the rollable display device according to a second aspect, each of the plurality of glass substrates is formed to continuously cover from one end on a storage unit side to the other end on a support bar side of a display region of the flexible display panel.

In the rollable display device according to a third aspect, the flexible display panel has a display surface and a back surface formed at an opposite side to the display surface, and the plurality of glass substrates is aligned at a display surface side of the flexible display panel.

In the rollable display device according to a fourth aspect, the flexible display panel has a display surface and a back surface formed at an opposite side to the display surface, and the plurality of glass substrates is aligned at a back surface side of the flexible display panel.

The rollable display device according to a fifth aspect further includes an adhesive resin layer formed between each of the plurality of the glass substrates and the flexible display panel and having peelability that is improved by an irradiation with ultraviolet rays.

The rollable display device according a sixth aspect further includes an adhesive resin layer formed between the plurality of glass substrates and the flexible display panel, a sealing member formed between the cover layer and the adhesive resin layer to seal the plurality of glass substrates, and a fluid filler filled in a space formed by the cover layer, the sealing member, and the adhesive resin layer.

In the rollable display device according to a seventh aspect, the fluid filler has thixotropy.

In the rollable display device according to an eighth aspect, the fluid filler includes glass beads.

In the rollable display device according to a ninth aspect, the cover layer is commonly provided on the plurality of glass substrates.

In the rollable display device according to a tenth aspect, each of a plurality of the cover layers is provided on each of the plurality of glass substrates.

In the rollable display device according to an eleventh aspect, the adhesive resin layer is commonly provided on the plurality of glass substrates.

In the rollable display device according to a twelfth aspect, each of a plurality of the adhesive resin layers is provided on each of the plurality of glass substrates.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in the embodiments.

The invention claimed is:

1. A rollable display device comprising:

a flexible display panel formed to be wound, a storage unit configured to wind the flexible display panel, the storage unit being provided at one end side of the flexible display panel, a support bar configured to support the flexible display panel, the support bar being provided at another end side of the flexible display panel, a plurality of glass substrates aligned side by side along a direction intersecting a winding direction of the flexible display panel, and a cover layer formed to cover the plurality of glass substrates.

2. The rollable display device according to claim 1, wherein each of the plurality of glass substrates is formed to continuously cover from one end on a storage unit side to another end on a support bar side of a display region of the flexible display panel.

3. The rollable display device according to claim 1, wherein the flexible display panel has a display surface and a back surface formed at an opposite side to the display surface, and the plurality of glass substrates is aligned at a display surface side of the flexible display panel.

4. The rollable display device according to claim 1, wherein the flexible display panel has a display surface and a back surface formed at an opposite side to the display surface, and the plurality of glass substrates is aligned at a back surface side of the flexible display panel.

5. The rollable display device according to claim 1, further comprising:

an adhesive resin layer formed between each of the plurality of the glass substrates and the flexible display panel, the adhesive resin layer having peelability that is improved by irradiation with ultraviolet rays.

6. The rollable display device according to claim 1, further comprising:

an adhesive resin layer formed between the plurality of glass substrates and the flexible display panel, a sealing member configured to seal the plurality of glass substrates, the sealing member being formed between the cover layer and the adhesive resin layer, and a fluid filler filled in a space formed by the cover layer, the sealing member, and the adhesive resin layer.

7. The rollable display device according to claim 6, wherein the fluid filler has thixotropy.

8. The rollable display device according to claim 6, wherein the fluid filler includes glass beads.

9. The rollable display device according to claim 1, wherein the cover layer is commonly provided on the plurality of glass substrates.

10. The rollable display device according to claim 1, wherein each of a plurality of the cover layers is provided on each of the plurality of glass substrates.

11. The rollable display device according to claim 5, wherein the adhesive resin layer is commonly provided on the plurality of glass substrates.

12. The rollable display device according to claim 5, wherein each of a plurality of the adhesive resin layers is provided on each of the plurality of glass substrates.

* * * * *